May 20, 1958 J. H. BOSE 2,835,803
LINEAR DETECTOR FOR SUBCARRIER FREQUENCY MODULATED WAVES
Filed Oct. 12, 1953 3 Sheets-Sheet 1
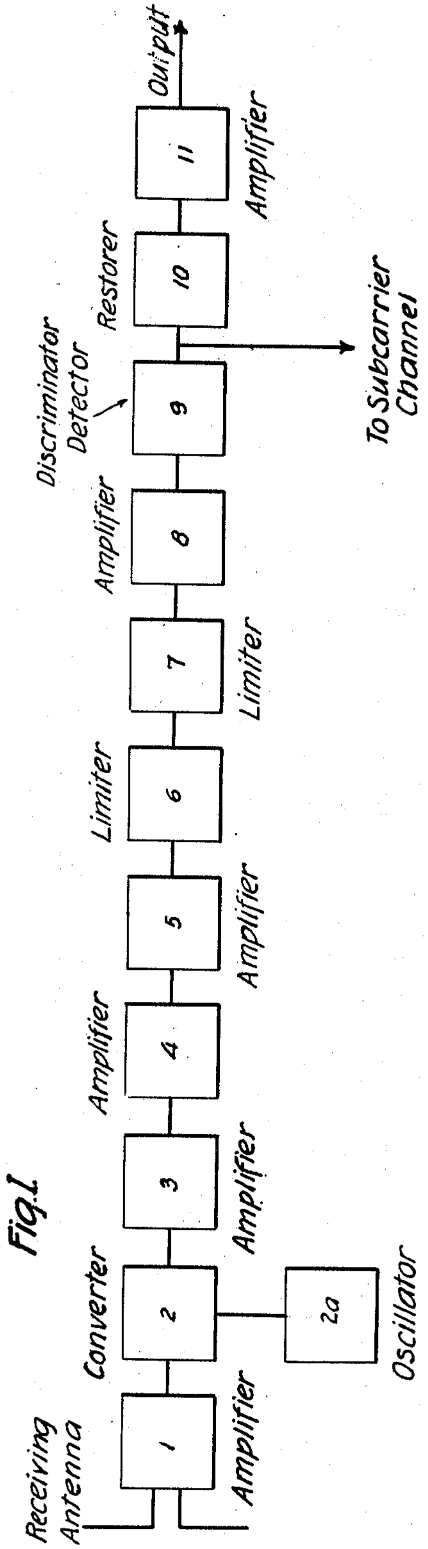
Fig. I
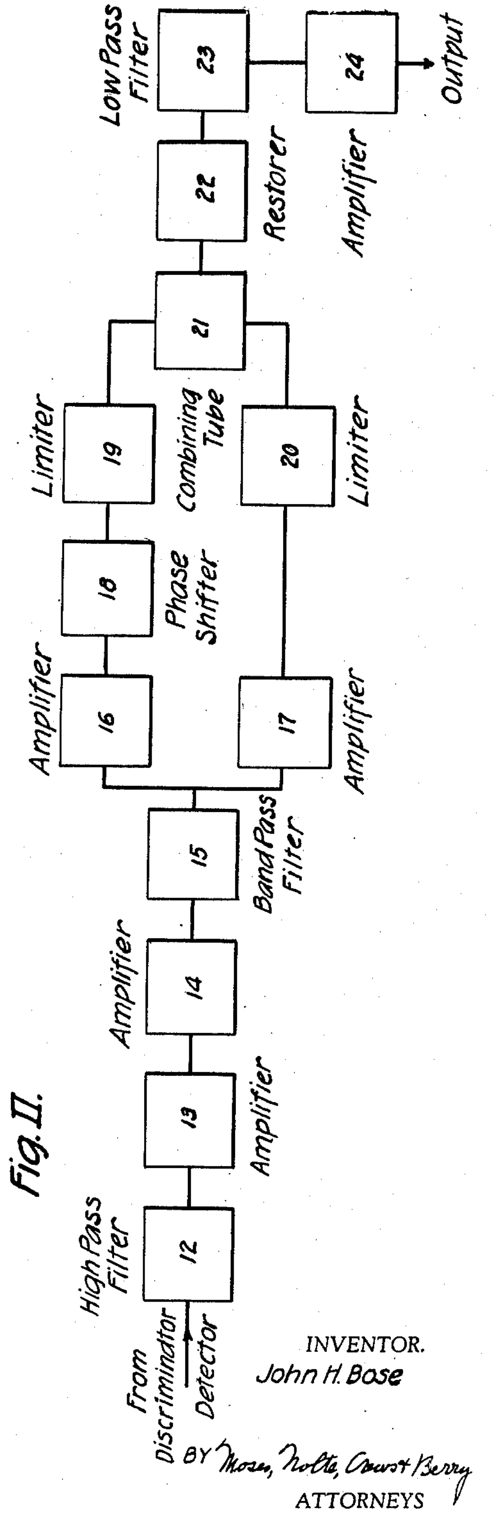
Fig. II.
INVENTOR.
John H. Bose
BY Moses, Nolte, Crews & Berry
ATTORNEYS LINEAR DETECTOR FOR SUBCARRIER FREQUENCY MODULATED WAVES
Filed Oct. 12, 1953 3 Sheets-Sheet 2
Fig. III.
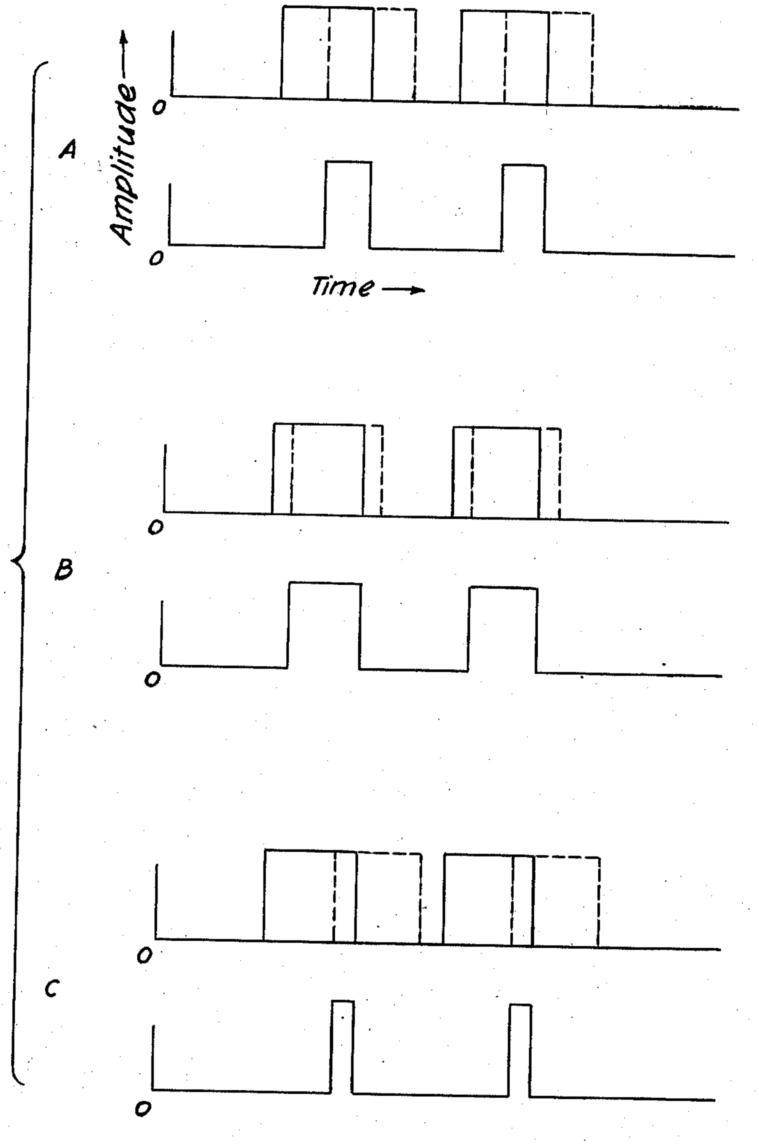
INVENTOR.
John H. Bose
BY Moses, Nolte, Crews & Berry
ATTORNEYS LINEAR DETECTOR FOR SUBCARRIER FREQUENCY MODULATED WAVES
Filed Oct. 12, 1953 3 Sheets-Sheet 3
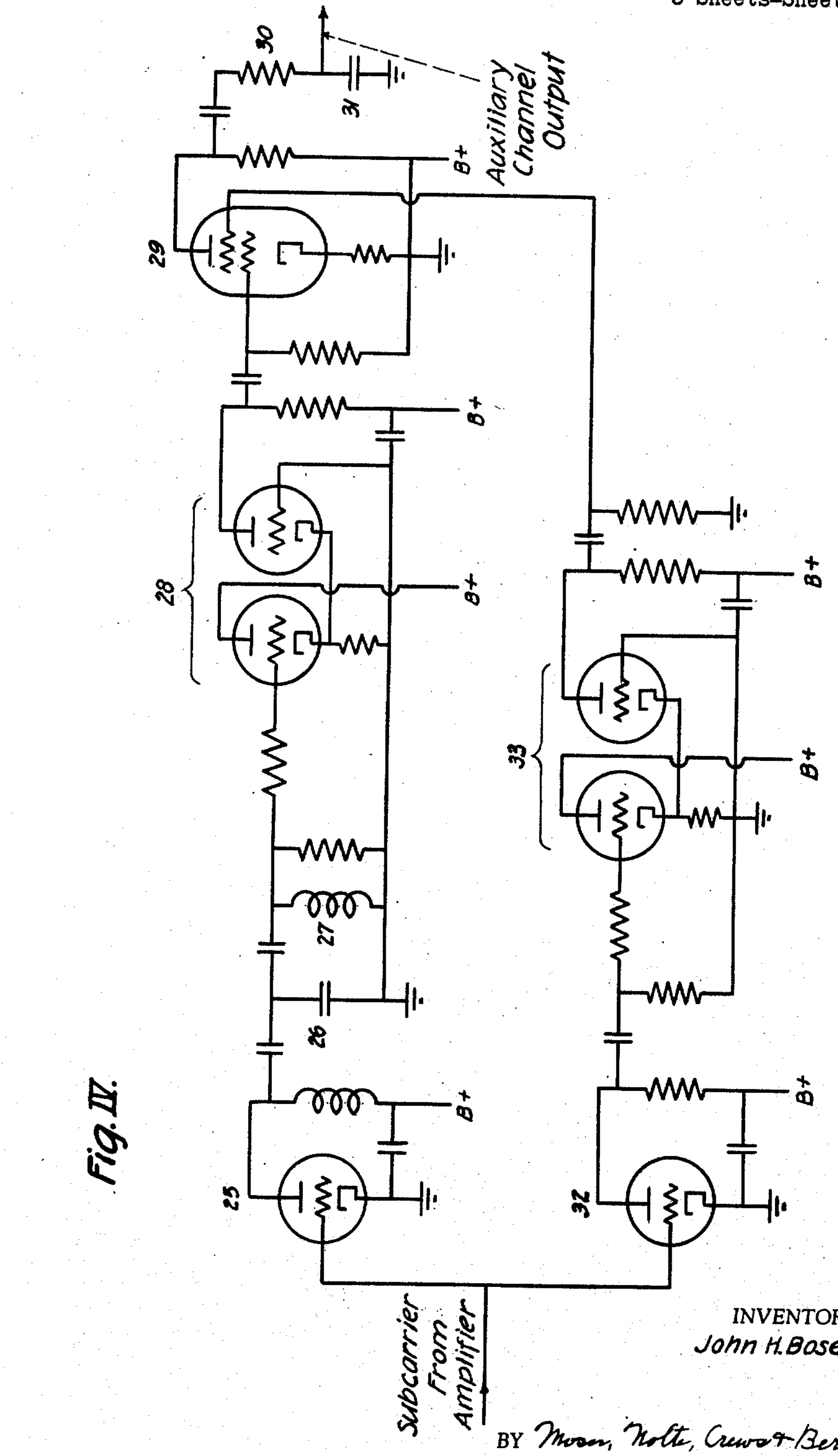
Fig. IV.
INVENTOR.
John H. Bose
BY Moser, Nolte, Crews & Berry
ATTORNEYS

United States Patent Office 2,835,803

Patented May 20, 1958

2,835,803

LINEAR DETECTOR FOR SUBCARRIER FREQUENCY MODULATED WAVES

John H. Bose, New York, N. Y., assignor to Esther Marion Armstrong, executrix of the estate of Edwin H. Armstrong, New York, N. Y.

Application October 12, 1953, Serial No. 385,482

6 Claims. (Cl. 250—27)

This invention relates to improvements in the linearity of detection of frequency modulated multiplexed signals. It has for its object the provision of highly linear means for deriving faithfully reproduced signal currents from a form of frequency modulated multiplexed signal in which a main carrier and an accompanying subcarrier are both frequency modulated on a common carrier wave to provide a plurality of communication channels instead of a single channel. In a multiplex receiver for a system of this type, the multiplex frequency modulated wave is passed through highly linear receiving apparatus which may preferably be of the character described in my copending application, Serial No. 385,369, filed on October 12, 1953. This portion of the receiver which is common both to the main channel and to the auxiliary channel has both substantially linear phase-frequency characteristics and a substantially flat amplitude-frequency characteristic over the frequency range involved.

After detection and careful separation from the demodulated main channel signals, the auxiliary channel subcarrier wave appears in the form of a highly modulated frequency modulated wave, and not withstanding the use of highly linear common receiving and discriminator-detector apparatus, there may nevertheless be some appreciable residual components of the main channel modulation which are present in the auxiliary channel subcarrier and which could appear as objectionably noticeable crosstalk at the output of the auxiliary channel.

The present invention is principally concerned with a demodulator-detector for highly modulated subcarrier waves of this type. Such waves may, for example, be of an ultra-audible subcarrier frequency such as 30 kilocycles frequency-modulated to produce a maximum frequency deviation of ±5 kc. from the 30 kc. subcarrier center frequency. Expressed in terms of percentage, the maximum deviation exceeds ±16% from the center frequency of the subcarrier, thus making the use of a conventional discriminator using ordinary tuned circuits impractical because the frequency excursions would extend into the appreciably non-linear portions of the usual resonance curves and introduce objectonable distortion.

The present invention relates more particularly to improved auxiliary channel demodulation apparatus for a multiplex receiver of the type shown in Patent No. 2,630,497 issued on March 3, 1953, to Edwin H. Armstrong. Both the main channel and auxiliary channel modulations are subjected to pre-emphasis of their high frequency components with respect to their low frequency components prior to modulation of the carrier, and this pre-emphasis of the high frequencies is subsequently corrected after demodulation by a network commonly referred to as a "restorer." This is the usual practice in frequency modulation systems and is shown and described in Reissue Patent No. 21,660, granted to Edwin H. Armstrong on December 17, 1940.

In the system shown in Fig. 5 of Armstrong Patent No. 2,630,497 referred to above, demodulation of the highly modulated auxiliary channel subcarrier is effected by means of an oscillator and converter which beat the modulated subcarrier to derive the auxiliary channel modulations therefrom. In the detecting apparatus of the present invention, no such oscillator and converter are required and both a high degree of stability of alignment and a high degree of fidelity of demodulation are obtained.

One of the principal objects of the invention resides in the provision of a highly linear frequency modulation detector, the degree of linearity being sufficiently high to accommodate multiplex frequency modulated signals without appreciable cross-modulation effects among the several channels.

Generally, the invention comprises means for the simultaneous passage of the subcarrier wave through two distinct channels. In each channel, there is provided a limiter which effectively limits the amplitude of the subcarrier wave. These two limiters remove any residual main channel modulation of an amplitude modulation nature along with any noise which may be present. Means are provided in at least one of the two channels for causing the phase shift in one channel to vary with frequency in a highly linear manner throughout the frequency range of the subcarrier modulation. The outputs of the two channels are thereafter combined by means of electronic switching means, preferably in the form of a gated beam power tube, and a constant amplitude output wave of rectangular wave form is obtained. This output wave, being controlled conjointly by the signals in the two channels, has a varying time base for each element of the output wave, this time base varying linearly with respect to the subcarrier modulation. The average amplitude of this output wave therefore faithfully follows the modulation of the highly modulated subcarrier with a high degree of linearity. A restorer located directly at the output of the electronic switching device inherently removes a large portion of the subcarrier and the remaining components of subcarrier and higher frequencies are thereafter removed by means of a low pass filter to obtain the desired output for the subcarrier channel.

Other objects, features and advantages of the invention will become apparent upon reading the following specification together with the accompanying drawing forming a part hereof.

Referring to the drawing:

Figure 1 is a schematic diagram illustrating generally the arrangement of a multiplex frequency modulation receiver.

Figure 2 shows the general arrangement of a highly linear detector of the type with which the present invention is concerned.

Figure 3 shows a series of waveform diagrams illustrating the operation of a detector in accordance with the invention.

Figure 4 is a circuit diagram showing in detail a preferred embodiment of the invention.

The particular problem to the solution of which this invention is directed is the reduction of cross modulation effects from the main channel to the subcarrier frequency channel and the demodulation of the subcarrier channel in a simple and stable way. It is difficult when the subcarrier frequency is of the order of 30 kc. to construct an ordinary phase sensitive discriminator with low distortion. Impulse counting methods are, of course, effective at these frequencies, but because of the high voltage level at which the apparatus must be operated, substantial amounts of filtering are required to keep the pulses out of the audio amplifying system and such methods and apparatus are otherwise unduly complex.

It is the purpose of this invention to provide a detector which is sufficiently linear and stable to eliminate interchannel cross modulation to the extent required to make it unobjectionable while simultaneously reducing the distortion of the subcarrier detection apparatus to a suitable low level and stably maintaining any distortion at a low level without any necessity for repeated adjustment of the equipment.

Referring now to Fig. 1, this figure illustrates the receiving arrangement for receiving multiplexed F. M. signals with a frequency modulated subcarrier together with the special detector arrangement of this invention. In this figure, circuit units 1—7 represent the usual arrangement of an F. M. receiver equipped with double limiting, 8 an amplifier for raising the energy output of the limiter to suitable level for the wideband discriminator detector 9, 10 the usual restorer and 11 an output amplifier. The second or subcarrier auxiliary channel is taken from the output of the discriminator detector circuit 9 as illustrated in the diagram.

The specific arrangement of the receiving system for the subcarrier which forms the basis of this specification is shown in the part comprising circuit units 12—24. 12 represents a high pass filter for removing the main channel currents, 13 an amplifier, 14 a second amplifier and 15 a band pass filter for passing the band of the subcarrier modulations, 16 and 17 are amplifiers, 18 a phase sensitive network producing a phase shift which varies linearly with respect to frequency changes, and 19 and 20 are limiters. The limiters 19 and 20 may be double triodes arranged to produce limited amplitude square wave form currents. 21 represents a combining tube which may be conveniently a type 6BN6 detector limiter of the gated beam power type. 22 represents a restorer, 23 a low pass filter and 24 an amplifier for the demodulated audio frequency output current.

The manner of operation of the system will be understood from the following explanation.

The main part of the receiver 1—9, operates in the usual manner to produce in the output of the discriminator detector 9 both the modulations of the main modulating frequency and the modulated super audible subcarrier. The subcarrier frequency is filtered out by the joint action of the high pass filter 12 and band pass filter 15. Amplifiers 13 and 14 raise the level sufficiently to overcome filter losses and prevent these losses from creating a noise problem at the output of the filtering apparatus. The output of the filter 15 is branched to two amplifier chains 16 and 17, one of which contains a phase shifting network for causing the phase of the output current to vary with frequency. The output of this network and that of the other chain are passed thru limiters 19 and 20 of a type which produces preferably a square wave form as illustrated in Fig. 3A. These two square waves, which are caused to differ in phase by 90° by means of the network 18 are then combined in a tube, 21, which may conveniently be a tube of the 6BN6 type. The 6BN6 tube 21 is commonly referred to as a gated beam power tube and comprises an electron gun structure for producing an electron beam and an anode to which the beam is normally directed. Two deflecting electrodes are provided for diverting the beam away from the anode. Either control electrode may divert the beam to effectively interrupt the anode-cathode circuit and the anode-cathode circuit will be effectively fully conductive only when the potentials applied to the two control electrodes have simultaneous polarities each in a particular direction. At all other times, the anode-cathode circuit will be effectively interrupted.

As the frequency of the subcarrier is varied the superposition of the two square waves will vary in the manner indicated in Figs. 3B and 3C and the time position of one series of rectangular wave elements moved in accordance with the phase shift which in turn varies linearly with the change in frequency over a range determined by the characteristics of the phase shifting network 18. The resultant detected frequencies of the signal are then reproduced in the output of the gated beam power combining tube and the restorer 22 recreates the proper relationship between the low and high frequency signal components. The subcarrier is more effectively removed from the audio amplifying system if a low pass filter as shown at 23 is included in the output circuit.

Referring now specifically to Fig. 4 the detailed arrangement of the limiting and detection system 16—21 is illustrated in the circuit diagram by 25—33. In this figure 25, is an amplifier containing in its plate a coupled circuit transformer 26, 27 suitably tuned and damped to produce across the second circuit a phase shift of 90° with respect to the voltage impressed on the grid of the vacuum tube 25. This voltage is applied to the input of a "see-saw" limiter 28 whose output drives one of the grids of a multigrid vacuum tube which may be of the 6BN6 variety as illustrated by 29 whose output contains a restorer of the usual type 30 and 31. The other branch of the circuit drives the resistance coupled amplifier 32, whose output is applied to the actuation of a second type "see-saw" limiter 33, whose output in turn, is applied to a second grid of the detection tube 29. The "see-saw" limiters produce square waves of the type illustrated in Fig. 3 suitably displaced one from the other by 90°. In accordance with the manner already described, the change in position of the two square wave pulses due to the phase variations as a result of frequency changes in the circuit 26—27 recreates the modulations impressed on the system at the transmitter.

I find that the above described arrangement is particularly free from cross modulation effects and that the distortion may be kept to a low level more effectively and cheaply than any of the methods of receiving the low frequency subcarrier modulations that are known.

I claim:

1. A frequency modulation detector for subcarrier waves comprising: two amplifier chains to which the frequency modulated signal to be detected is simultaneously applied; a phase shifting network serially included in one of said chains for causing the phase of its output to vary substantially linearly with respect to frequency; individual limiting means coupled to each chain, the output of each limiting means producing an output wave of rectangular wave form, the phase of one of said rectangular waves being controlled by said network so as to be shifted with respect to the other; and combining means comprising an electron tube having two control electrodes each individually coupled to one of said limiting means, the output of said combining means being controlled jointly by said two rectangular waves.

2. A frequency modulation detector according to claim 1, wherein at the unmodulated average frequency of said frequency modulated signal, said network causes the phase of said one wave to be shifted with respect to the phase of said other wave by an angle of 90°.

3. A frequency modulation detector according to claim 1, wherein the modulations of said frequency modulated wave are predistorted in such a manner that the ratio of the frequency deviations of the wave to the amplitudes of the corresponding signalling currents is greater for the higher frequencies of the signalling currents than for the lower frequencies thereof, and in which said detector further comprises filter means coupled to the output of said combining means, said filter means having an attenuation characteristic which attenuates the higher frequency currents in said output to a substantially greater degree than the lower frequency currents therein to compensate for said predistortion.

4. A linear detector for demodulating a frequency modulated subcarrier wave having a high degree of modulation, said detector comprising, in combination: input circuit means to which said modulated wave is applied; means defining two separate unidirectional transmission paths each having an input coupled to said input means to receive said modulated wave therefrom and an output for said modulated wave; phase shifting means included in one of said two transmission paths, said phase shifting means producing a shift in the phase of the wave in said one path with respect to the wave in the other of said paths, said phase shifting means causing the magnitude of the angle of phase shift produced thereby to vary linearly with respect to frequency in response to frequency variations throughout the entire range of frequency variation of said frequency modulated wave and means at the output of each transmission path for converting the modulated wave in each path to a rectangular wave of substantially constant amplitude; an electron tube having a cathode, an anode and two control electrodes, each control electrode being individually coupled to one of said transmission path outputs to receive said modulated wave therefrom, the circuit from said anode to said cathode being effectively fully conductive when the waves applied to said two control electrodes have simultaneous instantaneous polarities each in a particular direction and effectively interrupted at all other times; output circuit means connected to the anode-cathode circuit of said electron tube to derive a rectangular wave of constant amplitude therefrom; and filter means connected to said output circuit means for averaging the amplitude of said rectangular output wave to derive the modulations of said frequency modulated wave therefrom.

5. A linear detector for demodulating a frequency modulated subcarrier wave having a high degree of modulation, and in which the high frequency components of the modulating frequencies are modulated thereon to a higher degree than the low frequency components thereof, said detector comprising, in combination; input circuit means to which said modulated wave is applied; means defining two separate unidirectional transmission paths each having an input coupled to said input means to receive said modulated wave therefrom and an output for said modulated wave; phase shifting means included in one of said two transmission paths, said phase shifting means producing a shift in the phase of the wave in said one path with respect to the wave in the other of said paths, said phase shifting means causing the magnitude of the angle of phase shift produced thereby to vary linearly with respect to frequency in response to frequency variations throughout the entire range of frequency variation of said frequency modulated wave and means at the output end of each transmission path for converting the modulated wave in each path to a rectangular wave of substantially constant amplitude; an electron tube having a cathode, an anode and two control electrodes, each control electrode being individually coupled to one of said transmission path outputs to receive said modulated wave therefrom, the circuit from said anode to said cathode being effectively fully conductive when the waves applied to said two control electrodes have simultaneous instantaneous polarities each in a particular direction and effectively interrupted at all other times; output circuit means connected to the anode-cathode circuit of said electron tube to derive a rectangular wave of constant amplitude therefrom; and filter means connected to said output circuit means for averaging the amplitude of said rectangular output wave to derive the modulations of said frequency modulated wave therefrom, said filter means having a characteristic which attenuates said high frequency components of said modulations to a higher degree than said low frequency components whereby said modulations of said subcarrier wave will be faithfully reproduced.

6. A detector according to claim 5, wherein said angle of phase shift is 90° with said subcarrier wave unmodulated.

References Cited in the file of this patent

UNITED STATES PATENTS

| | | |
|---|---|---|
| 2,233,751 | Seeley | Mar. 4, 1941 |
| 2,261,286 | Rankin | Nov. 4, 1941 |
| 2,287,174 | Heising | June 23, 1942 |
| 2,343,263 | Okrent | Mar. 7, 1944 |
| 2,411,605 | Webb | Nov. 26, 1946 |
| 2,457,278 | Schoenbaum | Dec. 28, 1948 |
| 2,630,497 | Armstrong | Mar. 3, 1953 |

UNITED STATES PATENT OFFICE

CERTIFICATE OF CORRECTION

Patent No. 2,835,803 May 20, 1958

John H. Bose

It is hereby certified that error appears in the printed specification of the above numbered patent requiring correction and that the said Letters Patent should read as corrected below.

Column 4, line 42, before "each" insert -- the output of --; line 43, strike out "the output of".

Signed and sealed this 5th day of August 1958.

(SEAL)
Attest:

KARL H. AXLINE
Attesting Officer

ROBERT C. WATSON
Commissioner of Patents